(12) United States Patent
Tachibana

(10) Patent No.: US 6,973,083 B1
(45) Date of Patent: Dec. 6, 2005

(54) DATA PROCESSING CIRCUIT

(75) Inventor: Hisashi Tachibana, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/459,967

(22) Filed: Dec. 13, 1999

(30) Foreign Application Priority Data

Dec. 14, 1998 (JP) .......................................... P10-354735

(51) Int. Cl.[7] .............................. H04L 12/56; H04J 3/24
(52) U.S. Cl. ........................ 370/392; 370/471; 370/474
(58) Field of Search ................................. 370/471, 474, 370/389, 392, 396, 412, 465, 486, 487, 542; 725/85, 113, 114, 141, 142, 153

(56) References Cited

U.S. PATENT DOCUMENTS

| | | | | |
|---|---|---|---|---|
| 5,864,358 A | * | 1/1999 | Suzuki et al. ................ | 725/142 |
| 5,894,320 A | * | 4/1999 | Vancelette ................... | 725/138 |
| 5,966,385 A | * | 10/1999 | Fujii et al. ................... | 370/465 |
| 6,078,783 A | * | 6/2000 | Kawamura et al. .......... | 725/120 |
| 6,226,291 B1 | * | 5/2001 | Chauvel et al. .............. | 370/392 |
| 6,434,146 B1 | * | 8/2002 | Movshovich et al. ........ | 370/394 |

* cited by examiner

Primary Examiner—Chau Nguyen
Assistant Examiner—Soon D. Hyun
(74) Attorney, Agent, or Firm—Frommer Lawrence & Haug LLP; William S. Frommer; Dennis M. Smid

(57) ABSTRACT

A data processing circuit capable of selecting data of a specified channel without using an externally provided circuit for channel selection and outputting the same to a data transfer path, wherein channel identification data is extracted from input data in the application interface circuit based on a packet enable signal input from an MPEG transporter, the extracted channel identification data and channel specifying data are compared. The packet enable signal is output as a packet enable signal to a pre-transmission processing signal when they are identical from the comparison result, while a packet enable signal indicating invalidity is output to the pre-transmission processing circuit when they are not identical.

6 Claims, 8 Drawing Sheets

DATA PROCESSING CIRCUIT

BACKGROUND OF THE INVENTION

1. Field of the Invention

The present invention relates to a data processing circuit used for a data serial interface etc.

2. Description of the Related Art

As an interface for multimedia data transfer, an IEEE (The Institute of Electrical and Electronic Engineers) 1394 high performance serial bus which realizes high speed data transfer and real-time transfer has recently been standardized.

The data transfer by the IEEE 1394 serial interface includes the conventional asynchronous transfer for making requests, acknowledging requests, and acknowledging receipt and isochronous transfer wherein data is always sent once per 125 µs from a certain node.

In the IEEE 1394 serial interface having such two transfer modes, data is transferred in units of packets.

A data processing circuit used for the IEEE 1394 serial interface mainly comprises, as shown in FIG. 8, a physical layer circuit 1 for directly driving the IEEE 1394 serial bus BUS and a link layer circuit 2 for controlling data transfer of the physical layer circuit 1.

In the isochronous communication system in the above IEEE 1394 serial interface, for example as shown in FIG. 8, the link layer circuit 2 is connected to the IEEE 1394 serial bus BUS via a physical layer circuit 3.

The link layer circuit 2 is connected to an application 3, such as a moving picture coding experts group (MPEG) 2 transporter and a digital video cassette recorder (DVCR).

Summarizing the problem to be solved by the invention, data of, for example, digital satellite broadcasting is supplied to the link layer circuit 2 via a set-top box for digital satellite broadcasting. A plurality of channels are multiplexed in the data supplied to the set-top box.

A data processing circuit of the IEEE 1394 serial interface of the related art is not capable of selecting and outputting only a specified channel from the data comprised of a plurality of multiplexed channels.

Therefore, it has been necessary to provide an external circuit for selecting a channel for extracting data of a specified channel and inputting it to the link layer 2.

Also, when a specified channel is selected, there has been a desire in some cases to add information regarding the selected channel for transmission to the serial interface bus, however, the data processing circuit of the IEEE 1394 serial interface is not configured with the function of selecting a specified channel and adding information regarding the channel to the data of the selected channel.

SUMMARY OF THE INVENTION

An object of the present invention is to provide a data processing circuit capable of selecting data of a specified channel from data composed of a plurality of multiplexed channels and transmitting it to a data transmission path without using an external circuit for selecting a channel.

Another object of the present invention is to provide a data processing circuit capable of transmitting information data regarding the selected channel along with the data of the selected channel.

To attain the above objects, according to the present invention, there is provided a data processing circuit for receiving as input a plurality of packet data including packet data of at least one channel from an application side, selecting packet data of a desired channel from the input plurality of packet data, and transmitting the selected packet data to a data transmission path, comprising a channel identification data extracting circuit for extracting channel identification data regarding a selected channel in the input packet data; a comparison circuit for comparing the extracted channel identification data with channel specifying data regarding a predetermined selected channel; a packet data validity instruction signal generation circuit for outputting a packet data validity instruction signal indicating whether the packet data is valid or not based on the comparison result; and a transmission circuit for selecting the input packet data to the data transmission path when the packet data validity instruction signal is valid.

Packet data is input from the application side in a data processing circuit of the present invention.

Channel identification data in the input packet is extracted based on a first packet data validity instruction signal in a channel instruction data extraction circuit.

Then, the extracted channel identification data and channel specifying data are compared in a comparison circuit.

Then, in a packet data validity instruction signal generation circuit, the first packet data validity instruction signal is output as a second packet data validity instruction signal when the result of the comparison is that they are identical, while the second packet data validity instruction signal indicating invalidity is output when the result of the comparison is that they are not identical.

Then, in a transmission circuit, the packet data input at a timing when the second packet data validity instruction signal indicates valid is selected and transmitted to the data transmission path.

Also, in the data processing circuit of the present invention, preferably, the transmission circuit inserts data to the data transmission path during transmission at a timing when the second packet data validity instruction signal indicates invalidity.

Preferably, the inserting data is information data regarding the selected packet data in the data processing circuit of the present invention.

Preferably, the data processing circuit of the present invention further comprises a memory circuit for storing channel specifying data for specifying the predetermined channel to select.

Preferably, the data processing circuit of the present invention further comprises a computer for writing channel specifying data to the memory circuit.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Figure 1:
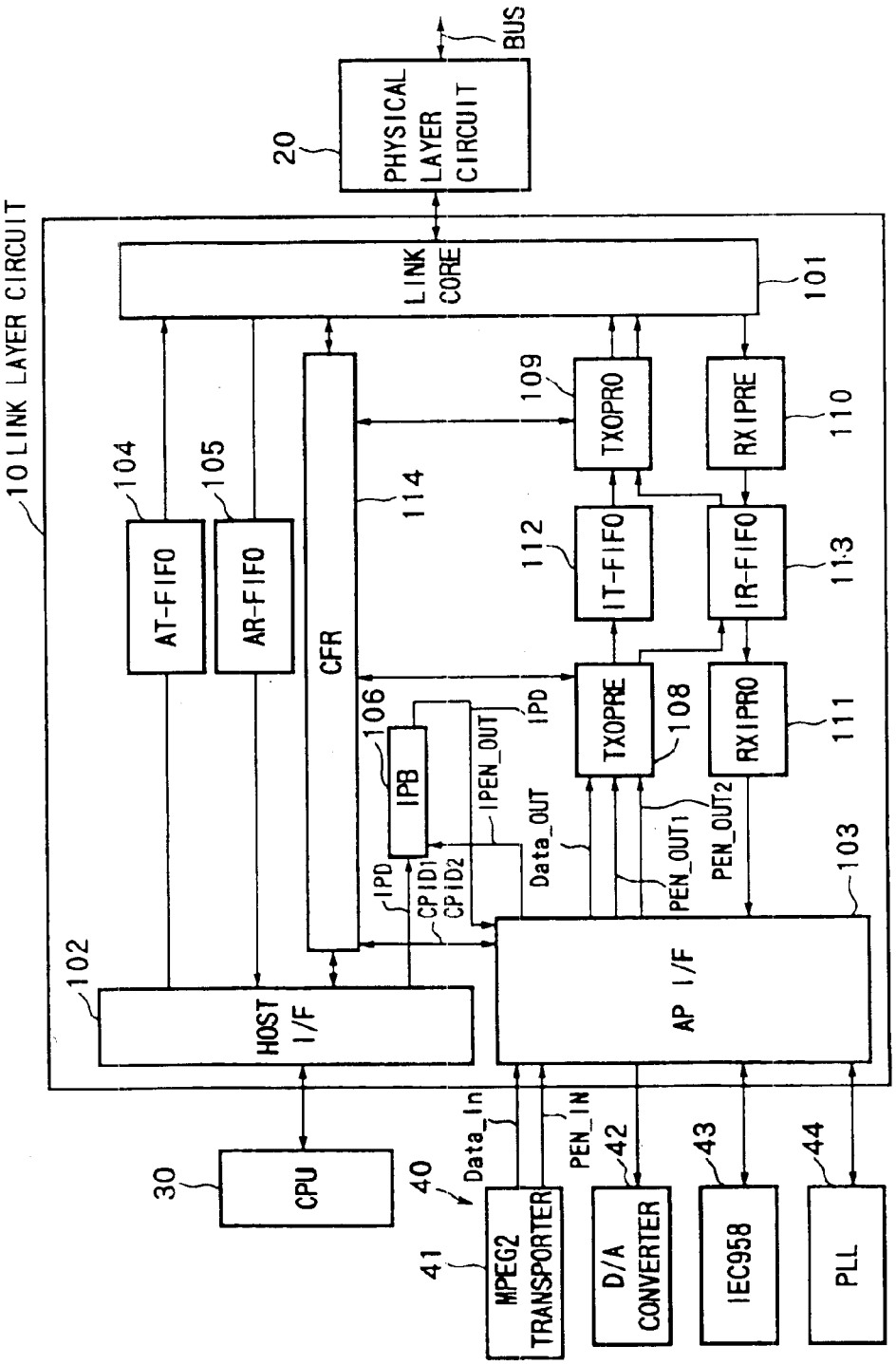
FIG. 1 is a block diagram of the configuration of an embodiment of an MPEG data processing circuit adopted in an IEEE 1394 serial interface according to the present invention.

FIG. 1 is a block diagram of the configuration of an embodiment of a data processing circuit adopted in an IEEE serial interface according to the present invention.

The data processing circuit comprises a link layer 10, a physical layer circuit 20, and a CPU 30 as a host computer. The link layer circuit 10 is connected to an application 40.

The application 40 comprises, as shown in FIG. 1, for example, an MPEG2 transporter 41, a digital/analog (D/A) converter 42, an IEC958 digital audio circuit 43, and a PLL circuit 44.

The link layer circuit 10 performs control of asynchronous transfer and isochronous transfer and control of the physical layer circuit 20 under the control of the CPU 30.

Specifically, the link layer 10 is, as shown in FIG. 1, configured by a link core circuit (LINK CORE) 101, a host interface circuit (HOST I/F) 102, an application interface circuit (AP I/F) 103, an asynchronous communication transmission FIFO circuit (AT-FIFO) 104, an asynchronous communication reception FIFO circuit (AR-FIFO) 105, an insert packet buffer (IPB) 106, an isochronous communication pre-transmission processing circuit (YXOPRE) 108, an isochronous communication post-transmission processing circuit (TXOPRO) 109, an isochronous communication pre-reception processing circuit (TXIPRE) 110, an isochronous communication post-reception processing circuit (TXIPRO) 111, an isochronous communication transmission FIFO circuit (IT-FIFO) 112, an isochronous communication transmission/reception FIFO circuit (IR-FIFO) 113, and a configuration register (hereinafter, referred to as CFR) 114.

In the link layer circuit 10 shown in FIG. 1, an asynchronous communication system circuit is configured by a host interface circuit 102, a transmission FIFO circuit 104, a reception FIFO circuit 105, and a link core circuit 101.

On the other hand, an isochronous communication system circuit is configured by an application interface circuit 103, a pre-transmission processing circuit 108, a post-transmission processing circuit 109, a pre-reception processing circuit 110, a post-transmission processing circuit 111, a transmission FIFO circuit 112, a transmission/reception FIFO circuit 113, and a link core circuit 101.

Link Core Circuit 101

A link core circuit 101 is configured by a transmission circuit and a reception circuit for asynchronous communication packet data and isochronous communication packet data, an interface circuit with a physical layer circuit 20 for directly driving an IEEE 1394 serial bus BUS of the packet data, a cycle timer reset every 125 μs, a cycle monitor, and a CRC circuit. For example, time data, such as a cycle timer, is supplied to the isochronous communication system processing circuit via the CFR 111.

Host Interface Circuit 102

A host interface circuit 102 mainly performs arbitration for writing and reading of asynchronous communication packet data between the CPU 30, the transmission FIFO circuit 104, and a reception FIFO circuit 105 and arbitration for transmission and reception of a variety of data between the CPU 30 and the CFR 114.

For example, when extracting transport stream (TS) packet data of any channel from a TS stream wherein a plurality of channels of digital satellite broadcasting input from the MPEG2 transporter 41 are multiplexed, channel specifying data CPID indicating channel identification data PID (partial identifier) of the TS packet data to be extracted is set to at least one of a PID register $Reg_1$ and a PID register $Reg_2$ in the CFR 114 from the CPU 30 via the host interface circuit 102.

Here, the reason why it is possible to set a total of two channels of channel specifying data CPID to the two PID registers $Reg_1$ and $Reg_2$ is that two channels of isochronous transmission are possible simultaneously in order that two channels of TS packet data can be simultaneously extracted.

Also, when it is required to insert packet data IPD comprising insert packet data to be added as information of a program provided by the TS packet data extracted from the TS stream from the MPEG2 transporter 41, a logical value "1" is set to a register IPTxGo of the CFR 114 from the CPU 30 via the host interface circuit 102.

Also, a PID on/off signal SW indicating whether or not to select a channel in the application interface circuit 103 is set to an PID on/off register of the CFR 114 from the CPU 30 via the host interface 102.

Transmission FIFO 104 and Reception FIFO 105

A transmission FIFO 104 stores asynchronous communication packet data to be transferred to the IEEE 1394 serial bus BUS.

Further, a reception FIFO stores asynchronous communication packet data transferred via the IEEE 1394 serial interface bus BUS.

Application Interface Circuit 103

An application interface circuit 103 performs arbitration for transmission and reception of data between the application 40, the pre-transmission processing circuit 108, and the post-reception processing circuit 111.

When selecting TS packet data of any channel from TS data comprised of a plurality of channels of digital satellite broadcasting transmitted from, for example, the MPEG2 transporter 41 are multiplexed, as explained above, packet enable signals $PEN\_OUT_1$ and $PEN\_OUT_2$ are generated for extracting TS packet data having identical channel identification data PID with channel specifying data CPID set to the PID registers $Reg_1$ and $Reg_2$ in the CFR 114.

Also, when transmitting information regarding the program to be provided by the extracted TS packet data as the insert packet data, the application interface circuit 103 generates an insert enable signal IPEN_OUT for determining a timing for transmitting the insert packet data.

Figure 2:
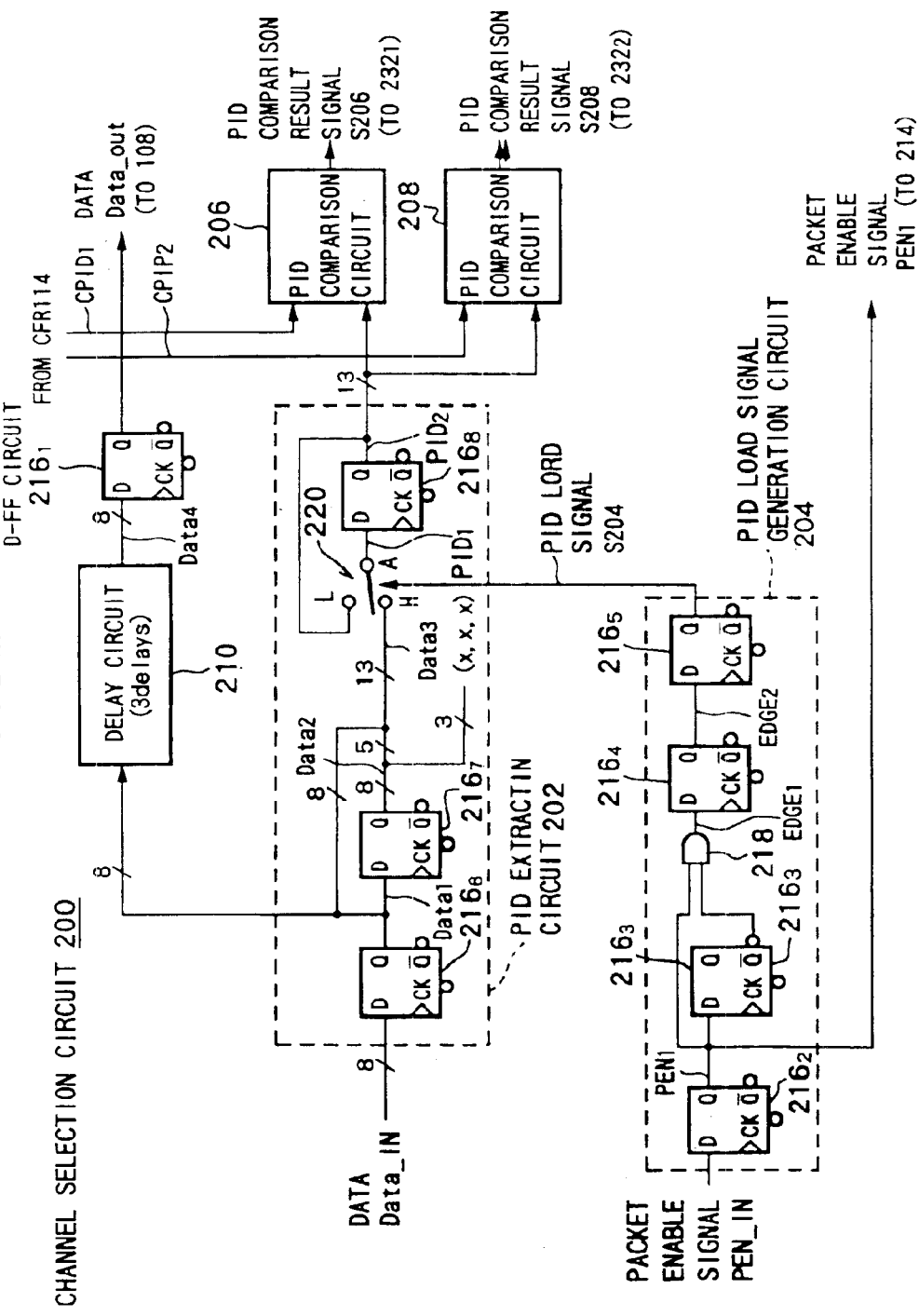
FIG. 2 is a partial view of the configuration of a channel selection circuit built in an application interface circuit shown in FIG. 1.
Figure 3:
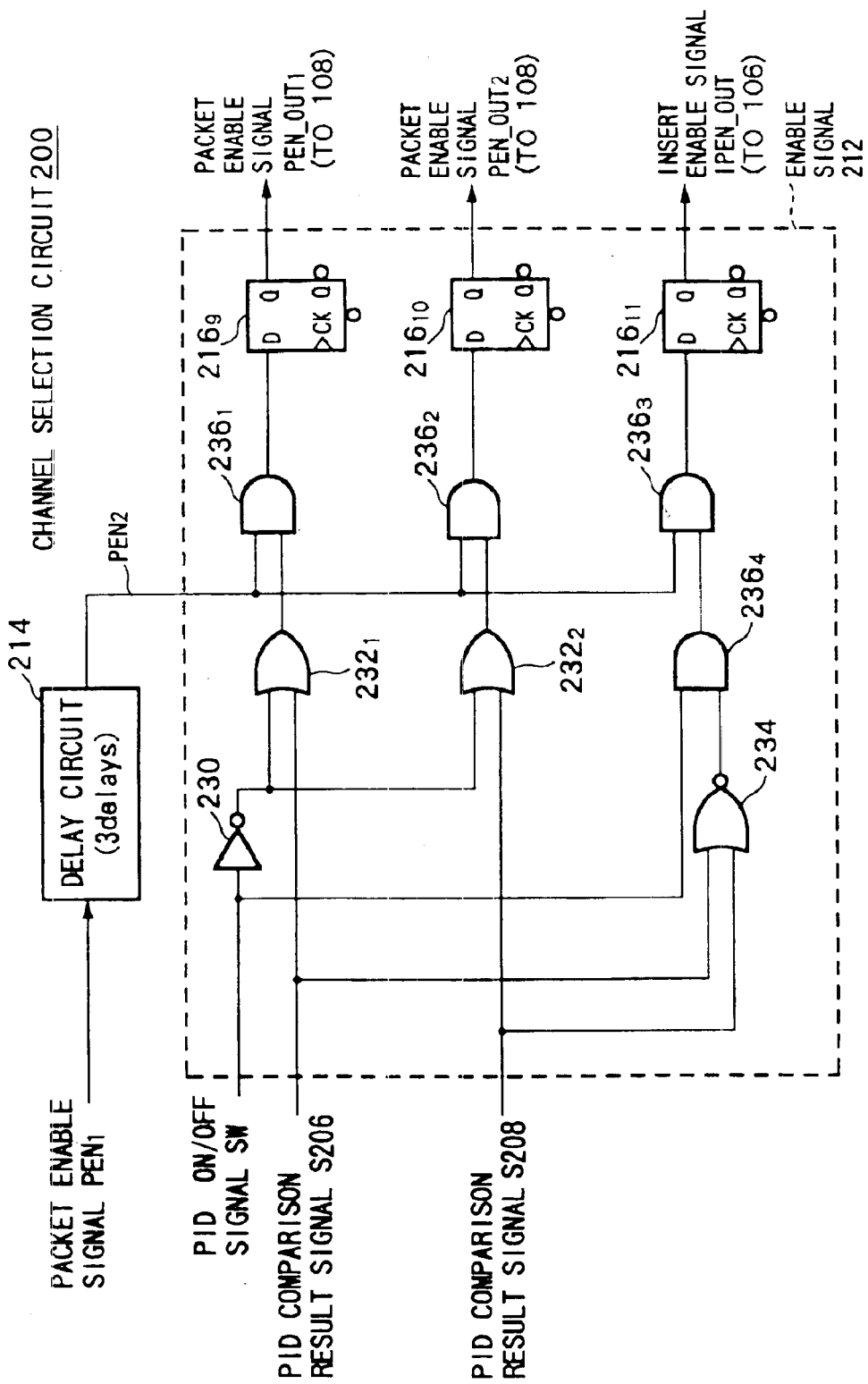
FIG. 3 is a partial view of the configuration of a channel selection circuit built in an application interface circuit shown in FIG. 1.

FIGS. 2 and 3 are block diagrams of an example of the configuration of a channel selection circuit 200 of the application interface circuit 103, and FIGS. 4A to 4R are timing charts of the respective signals shown in FIGS. 2 and 3.

As shown in FIGS. 2 and 3, the channel selection circuit 200 comprises a PID extraction circuit 202, a PID load signal generation circuit 204, a PID comparison circuits 206 and 208, a delay circuit 210, an enable signal generation circuit 212, a delay circuit 214, and a D-FF circuit 216₁.

Note that the components operate based on a clock signal CK output from a not shown clock signal generation circuit.

The channel selection circuit 200 receives as input data Data_IN of the TS data comprised of a plurality of multiplexed channels of digital satellite broadcasting and a packet enable signal PEN_IN from the MPEG2 transporter 41.

Also, the channel selection circuit 200 outputs the data Data_OUT and packet enable signal PEN_OUT₁ and PEN_OUT₂ to the pre-transmission processing circuit 108 and outputs an insert enable signal IPEN_OUT to an insert packet buffer 106.

Figure 4:
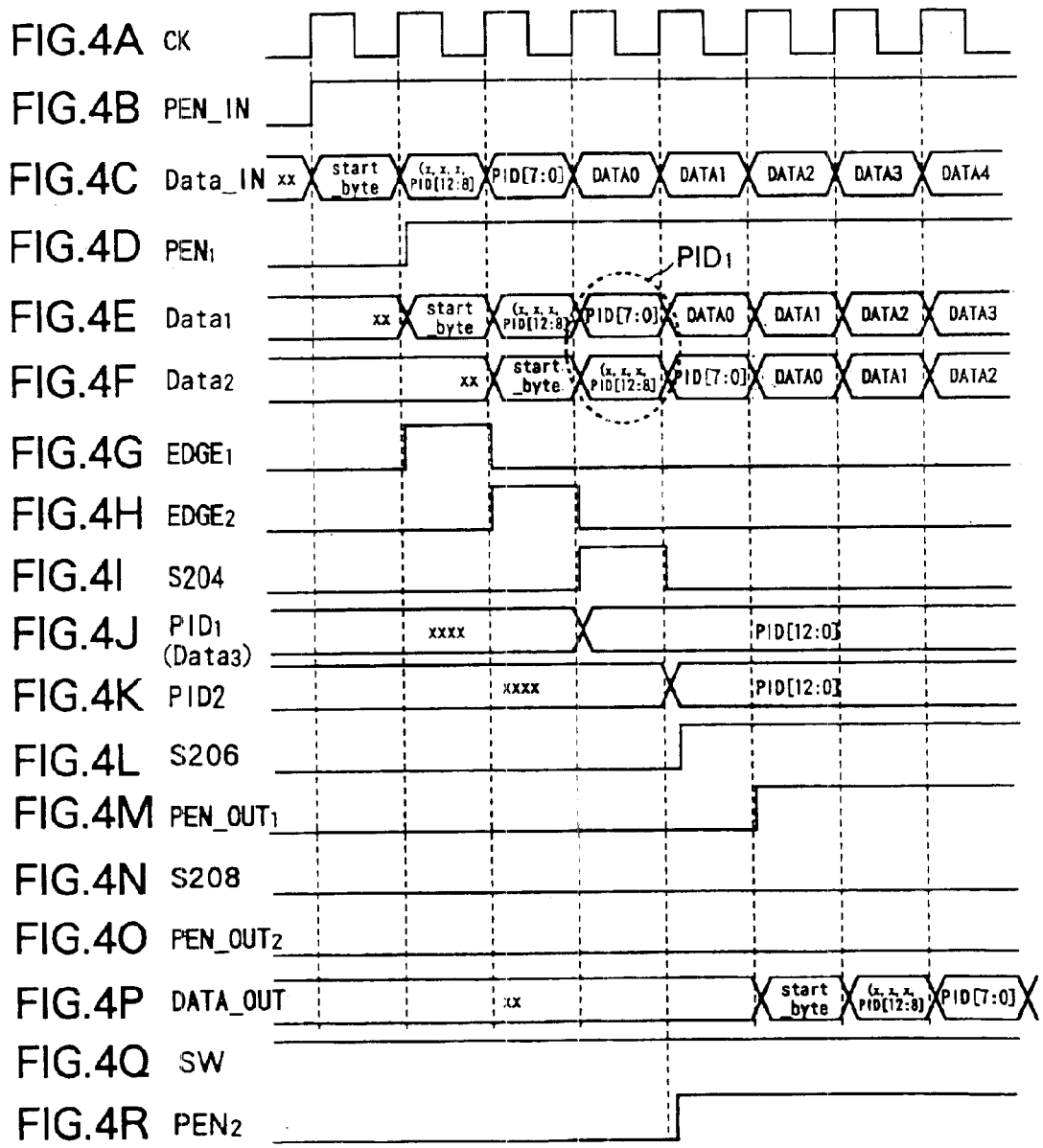
FIG. 4 is a timing chart of signals shown in FIGS. 2 and 3.

The components of the channel selection circuit 200 will be explained in detail next with reference to FIGS. 2 to 4 below.

[PID Extraction Circuit 202]

The PID extraction circuit 202 extracts 13-bit channel identification data PID from the respective 188 bytes of TS packet data comprising the TS data input from the MPEG2 transporter 41 shown in FIG. 1 based on the PID load signal S204 input from the PID load signal generation circuit 204.

As shown in FIG. 2, the PID extraction circuit 202 comprises D-FF circuits 216₆, 216₇, and 216₈ and a switching circuit 220.

The TS data is input to a D-terminal of the D-FF circuit 216₆ in the PID extraction circuit 202. Specifically, the 8-bit data Data_IN comprising the TS data is input in every clock cycle as shown in FIG. 4C to the D-terminal of the D-FF circuit 216₆ as shown in FIG. 2.

A Q-terminal of the D-FF circuit 216₆ is connected to the delay circuit 210, a D-terminal, and a Q-terminal of the D-FF circuit 216₇.

The Q-terminal of the D-FF circuit 216₇ is also connected to an H-terminal of the switching circuit 220.

An A-terminal of the switching circuit 220 is connected to a D-terminal of the D-FF circuit 216₈, while an L-terminal thereof is connected to a Q-terminal of the D-FF circuit 216₈.

The switching circuit 220 connects an A-terminal with an H-terminal when a PID load signal S204 from the PID load signal generation circuit 204 has a logic value of "1", while connects the A-terminal with an L-terminal when the PID load signal S204 has a logic value of "0".

Also, a Q-terminal of the D-FF circuit 216₈ is connected to the PID comparison circuits 206 and 208.

An example of the operation of the PID extraction circuit 202 will be explained next.

In the PID extraction circuit 202, for example, the data Data_IN shown in FIG. 4C output from the MPEG2 transporter shown in FIG. 1 is input to the D-terminal of the D-FF circuit 216₆ in units of 8 bits every clock cycle of the clock signal CK shown in FIG. 4A.

Here, as mentioned above, the data Data_IN is TS data, 188 bytes of which comprise 1 packet data, the first 8 bits thereof store the data start_byte for identifying the top of the packet data, 5 bits on the least significant bit (LSB) side [12:8] in the next 8 bits thereof store 5 bits on the most significant bit (MSB) side of the channel identification data PID, the next 8 bits store 8 bits on the LSB side of the channel identification data PID, and the rest stores data (payload).

The 8-bit data Data₁ shown in FIG. 4E obtained by delaying the data Data_IN shown in FIG. 4B by exactly 1 clock cycle in the D-FF circuit 216₆ is output to the delay circuit 210, the D-terminal of the D-FF circuit 216₇, and the Q-terminal side of the D-FF circuit 216₇.

Then, data Data₂ shown in FIG. 4F obtained by delaying the data Data₁ by exactly 1 clock cycle in the D-FF circuit 216₇ is output from the Q-terminal of the D-FF circuit 216₇.

Figure 5:
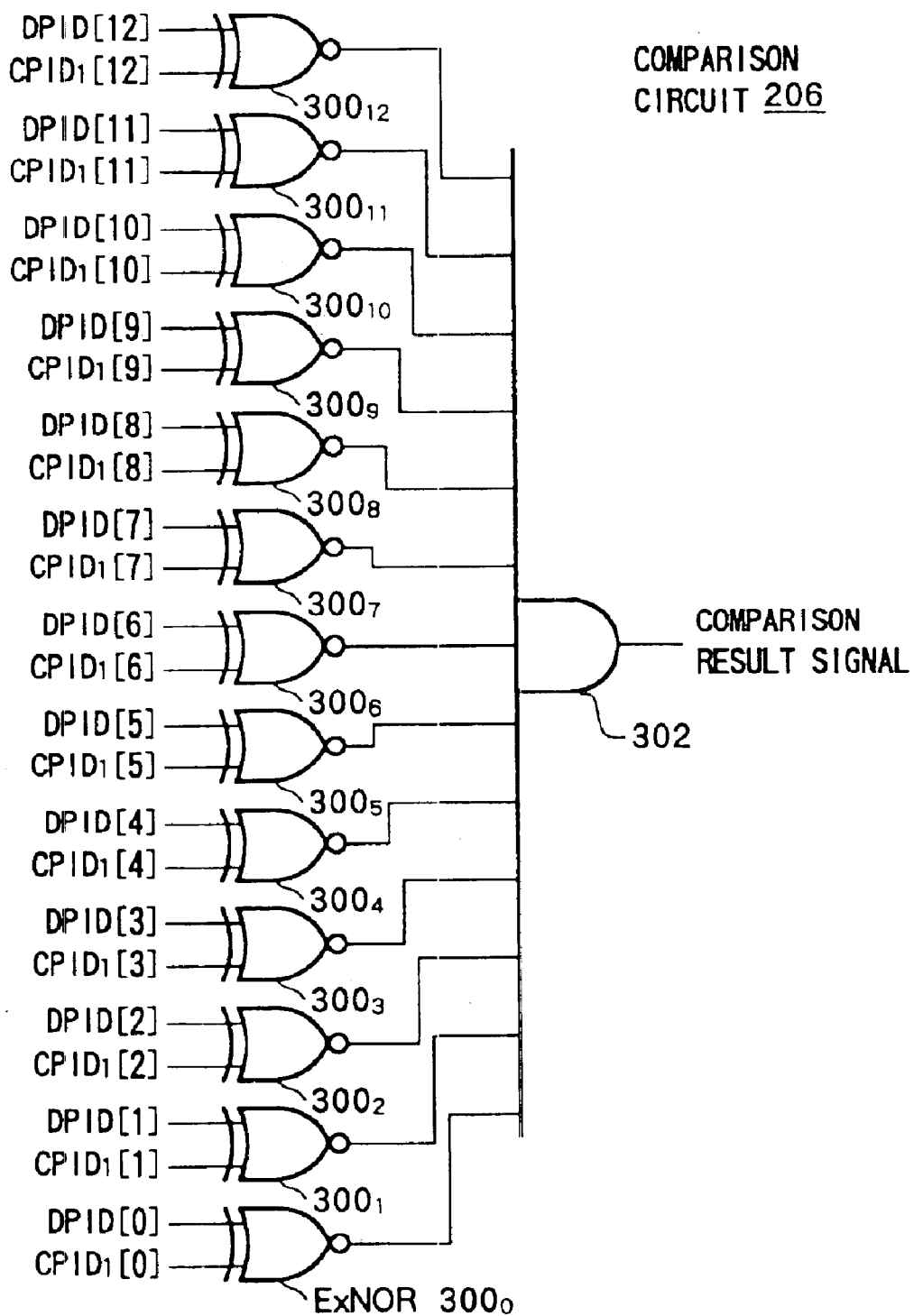
FIG. 5 is a view of the configuration of a first PID comparison circuit shown in FIG. 2.

Then, 13-bit data Data₃ composed of the data Data₁ shown in FIGS. 4E and 5 bits on the LSB side of the data Data₂ shown in FIG. 4F is output to the H-terminal of the switching circuit 220.

Then, during 1 clock cycle wherein the logic value of the PID load signal S204 is "1" as shown in FIGS. 4E, 4F, and 4I, the data Data₃ becomes channel identification data PID₁, the H-terminal and the A-terminal of the switching circuit are connected, and the channel identification data PID₁ is input to the D-terminal of the D-FF circuit 216₈.

Channel identification data PID₂ shown in FIG. 4K obtained by delaying the channel identification data PID₁ shown in FIG. 4J by exactly 1 clock cycle in the D-FF circuit 216₈ is output to the L-terminal of the switching circuit and the PID comparison circuits 206 and 208.

A PID load signal S204 has a logic value of "0" thereafter, the L-terminal and the A-terminal are connected in the switching circuit 220, and the logic value of the channel identification data PID₂ is maintained.

Note that the PID load signal S204 has the logic value of "1", as shown in FIGS. 4E, 4F, and 4I, at a timing when the PID data of 13 bits in total included in the data Data₁ and Data₂ is generated in the data Data₃. The timing is determined by the PID load signal generation circuit as will be explained below.

[PID Load Signal Generation Circuit 204]

The PID load generation circuit 204 generates a PID load signal S204 used for determining the timing for extracting the channel identification data PID in the PID extraction circuit 202 based on a packet enable signal PEN_IN input from the MPEG2 transporter 41 shown in FIG. 1. The PID load signal generation circuit 204 comprises, as shown in FIG. 2, D-FF circuits 216₂, 216₃, 216₄, and 216₅ and an AND circuit 218.

The packet enable signal PIN_IN shown in FIG. 4B is input to a D-terminal of the D-FF circuit 216₂.

A Q-terminal of the D-FF circuit 216₂ is connected to a D-terminal of the D-FF circuit 216₃ and one input terminal of the AND circuit 218.

A Q⁻-terminal of the D-FF circuit 216₃ is connected to the other input terminal of the AND circuit 218.

An output terminal of the AND circuit 218 is connected to a D-terminal of the D-FF circuit 216₄, while a Q-terminal of the D-FF circuit 216₄ is connected to a D-terminal of the D-FF circuit 216₅.

The above PID load signal S204 is output from a Q-terminal of the D-FF circuit 216₅ to the switching circuit 220.

The operation of the PID load signal generation circuit will be explained next.

The packet enable signal PIN_IN shown in FIG. 4B is input from the MPEG2 transporter shown in FIG. 1 to a D-terminal of the D-FF circuit 216₂, and a packet enable signal PEN₁ shown in FIG. 4D obtained by delaying the packet enable signal PEN_IN by exactly 1 clock cycle is output to a D-terminal of the D-FF circuit 216₃ and one input terminal of the AND circuit 218.

Then, when the logic value of the packet enable signal PEN₁ is switched to "1", a signal output from the Q-terminal of the D-FF circuit becomes "1" for 1 clock cycle from the switching, both of the two inputs of the AND circuit 218 become "1", and a pulse is generated as shown in FIG. 4G in an edge detection signal $EDGE_1$ output from the output terminal of the AND circuit 218.

Then, an edge detection signal $EDGE_2$ shown in FIG. 4H obtained by delaying the edge detection signal $EDGE_1$ shown in FIG. 4G by exactly 1 clock cycle is output to the D-terminal of the D-FF circuit $216_5$.

Then, the PID load signal S204 shown in FIG. 4I obtained by delaying the edge detection signal $EDGE_2$ shown in FIG. 4H by exactly 1 clock cycle is output to the switching circuit 220.

[Delay Circuit 210 and D-FF Circuit $216_1$]

The delay circuit 210 outputs data $Data_4$ obtained by delaying the data $Data_1$ shown in FIG. 4E output from the Q-terminal of the D-FF circuit $216_6$ by exactly 3 clock cycles in order to adjust the timing between the data Data_OUT and the packet enable signals $PEN\_OUT_1$ and $PEN\_OUT_2$.

The D-FF circuit $216_1$ outputs data Data_OUT shown in FIG. 4P obtained by delaying the data $Data_4$ input from the delay circuit 210 to the pre-transmission processing circuit 108.

[PID Comparison Circuit 206]

The PID comparison circuit 206 compares the 13-bit channel specifying data $CPID_1$ [0] to [12] read from a PID register $Reg_1$ in the CFR 114 with 13-bit channel identification data $PID_2$ [0] to [12] input from the Q-terminal of the D-FF circuit $216_8$ for every bit, generates a PID comparison result signal S206 having a logic value of "1" when all bits are identical while is otherwise "0" and outputs the PID comparison result signal S206 to an OR circuit $232_1$ shown in FIG. 3.

FIG. 5 is a view of the configuration of the PID comparison circuit 206.

As shown in FIG. 5, the PID comparison circuit 206 comprises exclusive (Ex) NOR circuits $300_0$ to $300_{12}$ each having two inputs and one output and an AND circuit 302 having 13 inputs and one output.

Here, the ExNOR circuit having two inputs and one output calculates an inversion of the exclusive OR. A logic value of the output is made to be "1" when the input data have the same logic value (that is, when their logic values are "1" and "1" or "0" and "0"), while it is made to be "0" in other cases.

As shown in FIG. 5, the PID comparison circuit 206 receives as input respective 13-bit channel specifying data $CPID_1$[0] to [12] read from the PID register $Reg_1$ in the CFR 114 to one input terminal of the respective ExNOR circuits $300_0$ to $300_{12}$, while 13-bit channel identification data $PID_2$[0] to [12] input from the Q-terminal of the D-FF circuit $216_8$ to the other input terminal of the respective ExNOR circuit $300_0$ to $300_{12}$.

Also, the output terminals of the ExNOR circuits $300_0$ to $300_{12}$ are connected to an input terminal of the AND circuit 302.

The operation of the PID comparison circuit 206 will be explained next.

In the PID comparison circuit 206, when assuming that n is any integer from 0 to 12, an ExNOR circuit $300_n$ calculates an inversion of an exclusive OR of channel specifying data $CPID_1$[n] and channel identification data $PID_2$[n] and outputs a calculation result signal indicating the calculation result to the AND circuit 302.

In the AND circuit 302, a PID comparison result signal S206 is generated wherein the logic value becomes "1" when all result signals input from the ExNOR circuits $300_0$ to $300_{12}$ have the logic value of "1", that is, when the channel specifying data $CPID_1$ and the channel identification data $PID_2$ are identical, while the logic value becomes "0" in other cases.

The PID comparison result signal S206 is output to an OR circuit $232_1$ shown in FIG. 3.

[PID Comparison Circuit 208]

A PID comparison circuit 208 compares 13-bit channel specifying data $CPID_2$[0] to [12] read from the PID register $Reg_2$ in the CFR 114 and 13-bit channel identification data $PID_2$[0] to [12] input for the D-FF circuit $216_8$ for every bit, generates a PID comparison result signal S208 wherein a logic value becomes "1" when all bits are identical, while becomes "0" in other cases, and outputs the PID comparison result signal S208 to an OR circuit $232_2$ shown in FIG. 3.

Figure 6:
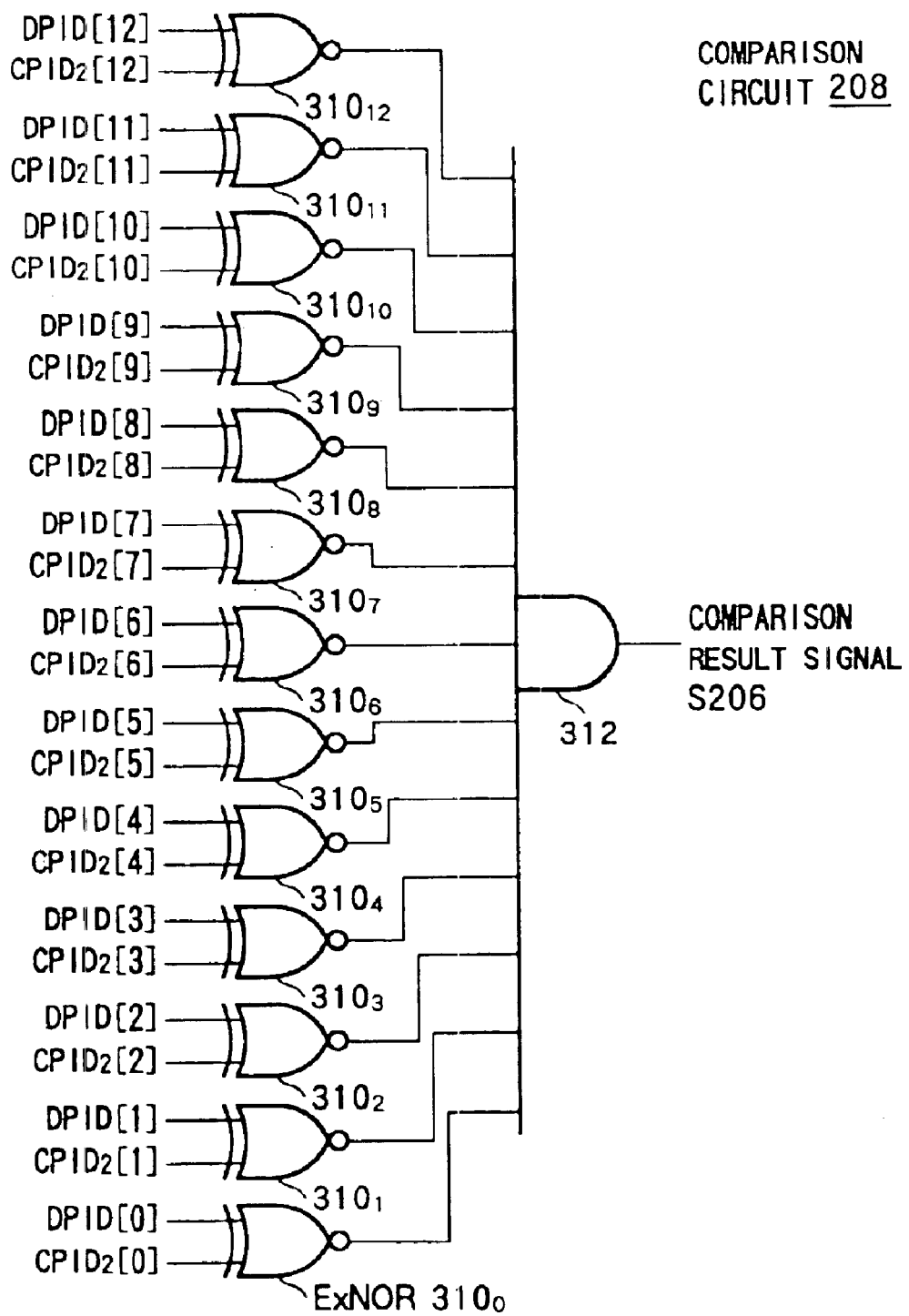
FIG. 6 is a view of the configuration of a second PID comparison circuit shown in FIG. 2.

FIG. 6 is a view of the configuration of the PID comparison circuit 208.

As shown in FIG. 6, the PID comparison circuit 208 has the same configuration with the PID comparison circuit 206 shown in FIG. 5 and comprises ExNOR circuits $310_0$ to $310_{12}$ having two inputs and one output and an AND circuit 312 having 13 inputs and one output.

As shown in FIG. 6, the PID comparison circuit 208 receives as input the respective 13-bit channel specifying data $CPID_2$[0] to [12] read from the PID register $Reg_2$ in the CFR 114 to one input terminal of the respective ExNOR circuits $310_0$ to $310_{12}$, while receives as input the respective 13-bit channel identification data $PID_2$[0] to [12] input from the Q-terminal of the D-FF circuit $216_8$ to the other input terminal of the respective ExNOR circuits $310_0$ to $310_{12}$. The output terminals of the ExNOR circuits $310_0$ to $310_{12}$ are connected to the input terminals of the AND circuit 312.

The operation of the PID comparison circuit 208 will be explained next.

In the PID comparison circuit 208, when assuming that n is any integer from 0 to 12, an ExNOR circuit $310_n$ calculates an inversion of an exclusive OR of channel specifying data $CPID_2$[n] and channel identification data $PID_2$[n] and outputs a calculation result signal indicating the calculation result to the AND circuit 312.

Then, in the AND circuit 312, a PID comparison result signal S208 is generated where the logic value becomes "1" when all calculation result signals input from the ExNOR circuits $310_0$ to $310_{12}$ have the logic value of "1", that is, when the channel specifying data $CPID_2$ and the channel identification data $PID_2$ are identical, while the logic value becomes "0" in other cases.

The PID comparison result signal S208 is output to an OR circuit $232_2$ shown in FIG. 3.

[Delay Circuit 214]

A delay circuit 214 receives as input a packet enable signal $PEN_1$ shown in FIG. 4D output from the Q-terminal of the D-FF circuit $216_2$ shown in FIG. 2, generates a packet enable signal $PEN_2$ shown in FIG. 4R by delaying the input packet enable signal $PEN_1$ by exactly 3 clock cycles, and outputs the generated packet enable signal $PEN_2$ to one input terminal of the AND circuits $236_1$ to $236_3$.

[Enable Signal Generation Circuit 212]

As shown in FIG. 3, the enable signal generation circuit 212 comprises an NOT circuit 230, OR circuits $232_1$ and $232_2$, an NOR circuit 234, AND circuits $236_1$ to $236_3$, and D-FF circuits $216_9$, $216_{10}$, and $216_{11}$.

The enable signal generation circuit 212 generates packet enable signals PEN_OUT$_1$ and PEN_OUT$_2$ and an insert enable signal IPEN_OUT from the packet enable signal PEN$_2$ input from the delay circuit 214 and PID comparison result signals S206 and S208 input from the PID comparison circuits 206 and 208 shown in FIG. 2, and a PID on/off signal SW read from the PID on/off register in the CFR 114 shown in FIG. 1.

As shown in FIG. 3, in the enable signal generation circuit 212, the PID on/off signal SW is input to an input terminal of the NOT circuit 230, and an output terminal of the NOT circuit 230 is connected to one input terminal of the OR circuits 232$_1$ and 232$_2$.

The other input terminal of the OR circuit 232$_1$ receives as input the PID comparison result signal S206 from the PID comparison circuit 206 shown in FIG. 2.

The output terminal of the OR circuit 232$_1$ is connected to one input terminal of the AND circuit 236$_1$.

The other input terminal of the OR circuit 232$_2$ receives as input the PID comparison result signal S208 from the PID comparison circuit 208.

The output terminal of the OR 232$_2$ is connected to one input terminal of the AND circuit 236$_2$.

Also, the input terminal of the NOR circuit 234 receives as input PID comparison result signals S206 and S208, and the output terminal of the NOR circuit 234 is connected to one input terminal of the AND circuit 236$_4$.

The other input terminal of the AND circuit 236$_4$ receives as input the PID on/off signal SW.

Also, the output terminal of the AND circuit 236$_4$ is connected to one input terminal of the AND circuit 236$_3$.

The other input terminals of the AND circuits 236$_1$, 236$_2$, and 236$_3$ receive as input a packet enable signal PEN$_2$ from the delay circuit 214.

The output terminals of the AND circuits 236$_1$, 236$_2$, and 236$_3$ are respectively connected to the D-terminals of the D-FF circuits 216$_9$, 216$_{10}$, and 216$_{11}$.

Also, packet enable signals PEN_OUT$_1$, PEN_OUT$_2$, and IPEN_OUT are output respectively from the Q-terminals of the D-FF circuits 216$_9$, 216$_{10}$, and 216$_{11}$.

The operation of the enable signal generation circuit 212 shown in FIG. 3 will be explained below.

In the enable signal generation circuit 212, when the PID on/off signal SW has a logic value of "1", namely, when a channel selection using the channel identification data PID is performed in the application interface circuit 103 and the packet enable signal PEN$_2$ obtained by delaying the packet enable signal PEN$_1$ by exactly 3 clock cycles has a logic value of "1", the PID comparison result signals S206 and S208 are delayed by exactly one clock cycle respectively in the D-FF circuits 216$_9$ and 216$_{10}$ and then respectively output as packet enable signals PEN_OUT$_1$ and PEN_OUT$_2$ to the pre-transmission processing circuit 108 shown in FIG. 1.

Also, on the condition that both of the PID comparison result signals S206 and S208 have a logic value of "0", the output of the NOR circuit 234 has a logic value of "1", and the insert enable signal IPEN_OUT output from the Q-terminal of the D-FF circuit 216$_{11}$ has a logic value of "1" after 1 clock cycle of delay.

Namely, when the channel identification data PID included in the packet data input from the MPEG2 transporter 41 is not identical with either of the channel specifying data CPID$_1$ and CPID$_2$ indicating a channel desired to be selected which is stored in the PID registers Reg$_1$ and Reg$_2$ in the CFR 114, the insert enable signal IPEN_OUT has a logic value of "1".

Below, referring to FIGS. 4A to 4R, an explanation will be given of the operation when the PID on/off signal SW has a logic value of "1" as shown in FIG. 4Q, namely, when channel selection using the channel identification data PID is performed in the application interface circuit 103 as shown in FIG. 4Q and logic values of the packet enable signal PEN$_1$ and the S206 become as shown in FIGS. 4D and 4L and when the S208 has a logic value of "0" as shown in FIG. 4N.

In this case, the packet enable signal PEN_OUT$_1$ shown in FIG. 4M obtained by delaying the S206 shown in FIG. 4L by exactly one clock cycle is output to the pre-transmission processing circuit 108 shown in FIG. 1 from the Q-terminal of the D-FF circuit 216$_9$.

The packet enable signal PEN_OUT$_2$ has a logic value of "0" as shown in FIG. 4O.

Insert Packet Buffer 106

The desired insert packet data IPD is written to the insert packet buffer 106 from the CPU 30.

For example, in the application interface circuit 103, when extracting TS packet data of any program from TS data of digital satellite broadcasting transmitted from the MPEG2 transporter 41 and outputting it to the IEEE 1394 serial bus BUS, information regarding the program provided by the extracted TS packet data is written as the insert packet data IPD to the insert packet buffer 106.

Also, the capacity of the insert packet buffer 106 is, for example, 188 bytes, data up to 188 bytes is valid and data exceeding the capacity is not transmitted.

When the transmission data is 188 bytes or less, data except the written data is set to "1" to be transmitted.

The insert packet data IPD once written in the insert packet buffer 106 is kept the value until rewriting.

The insert packet data IPD written in the insert packet buffer 106 is transferred to at least one of the transmission FIFO circuit 112 and the transmission/reception FIFO 113 via the application interface circuit 103 and the pre-transmission processing circuit 108 at a timing when the insert enable signal IPEN_OUT shown in FIG. 3 has a logic value of "1". At the time of transfer, a register IPTxGo of the above CFR 114 is set at "1". This is automatically set to be "0" when the transfer is completed. The CPU confirms the completion of the transfer by confirming the value.

Pre-Transmission Processing Circuit 108

When the packet enable signal PEN_OUT$_1$ has a logic value of "1", the pre-transmission processing circuit 108 receives as input from the application interface circuit 103 data Data_OUT shown in FIG. 2 and packet enable signals PEN_OUT$_1$ and PEN_OUT$_2$ comprising the TS packet data. The pre-transmission processing circuit 108 adjusts the data length of the data Data_OUT in units of quadlets (4 bytes) for the isochronous communication of the IEEE 1394 standard and then writes the same to the transmission FIFO 112.

Also, when the packet enable signal PEN_OUT2 has a logic value of "1", the pre-transmission processing circuit 108 adjust the data length of the data Data_OUT in units of quadlets (4 bytes) for the isochronous communication of the IEEE 1394 standard and then writes it to the transmission/reception FIFO 113.

Further, in the pre-transmission processing circuit 106, the data Data_OUT to be written in the transmission FIFO 112 and the transmission/reception FIFO 113 is enciphered in accordance with need.

Post-Transmission Processing Circuit 109

Figure 7:
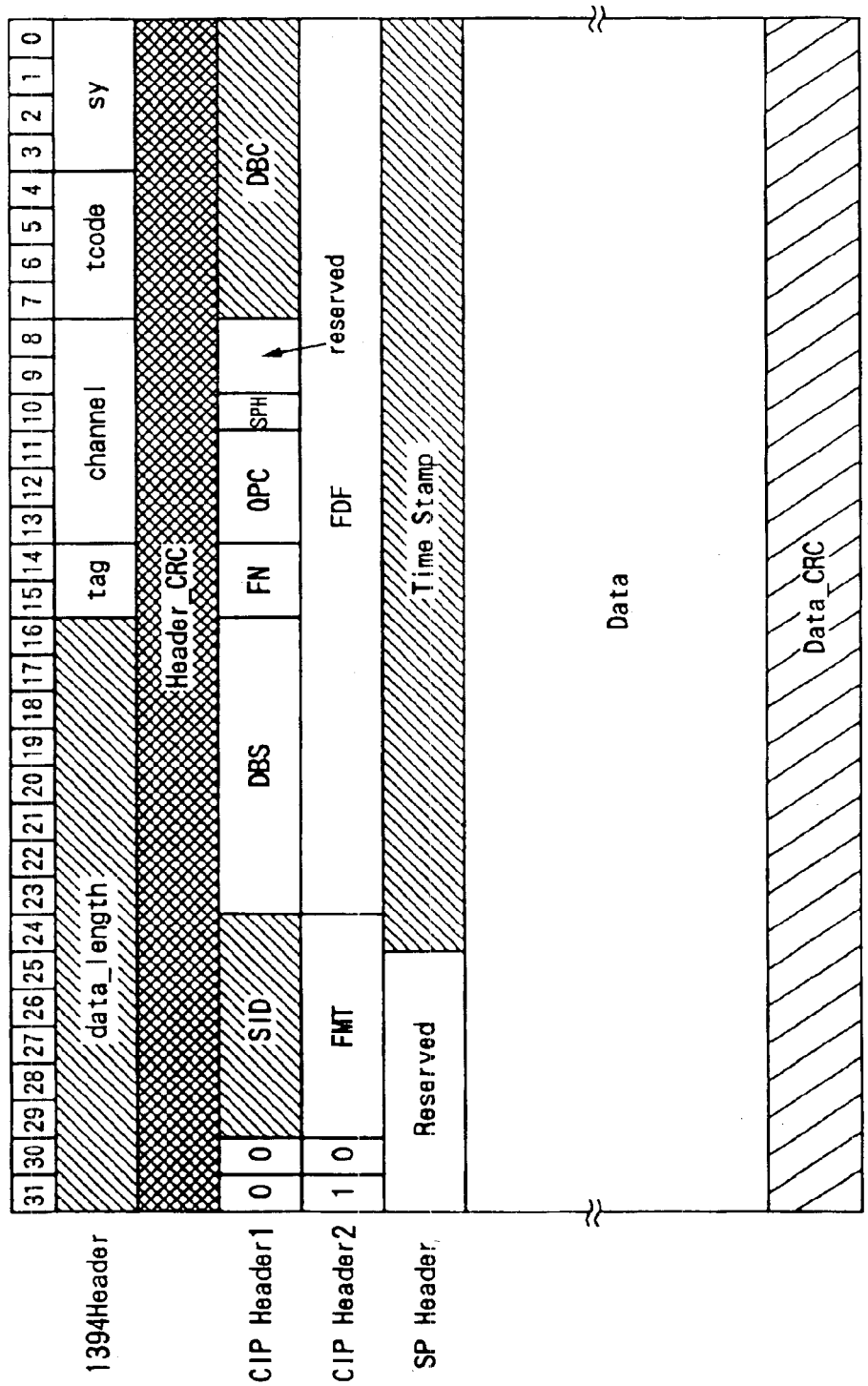
FIG. 7 is a view of an example of the basic configuration of an isochronous communication system.
Figure 8:
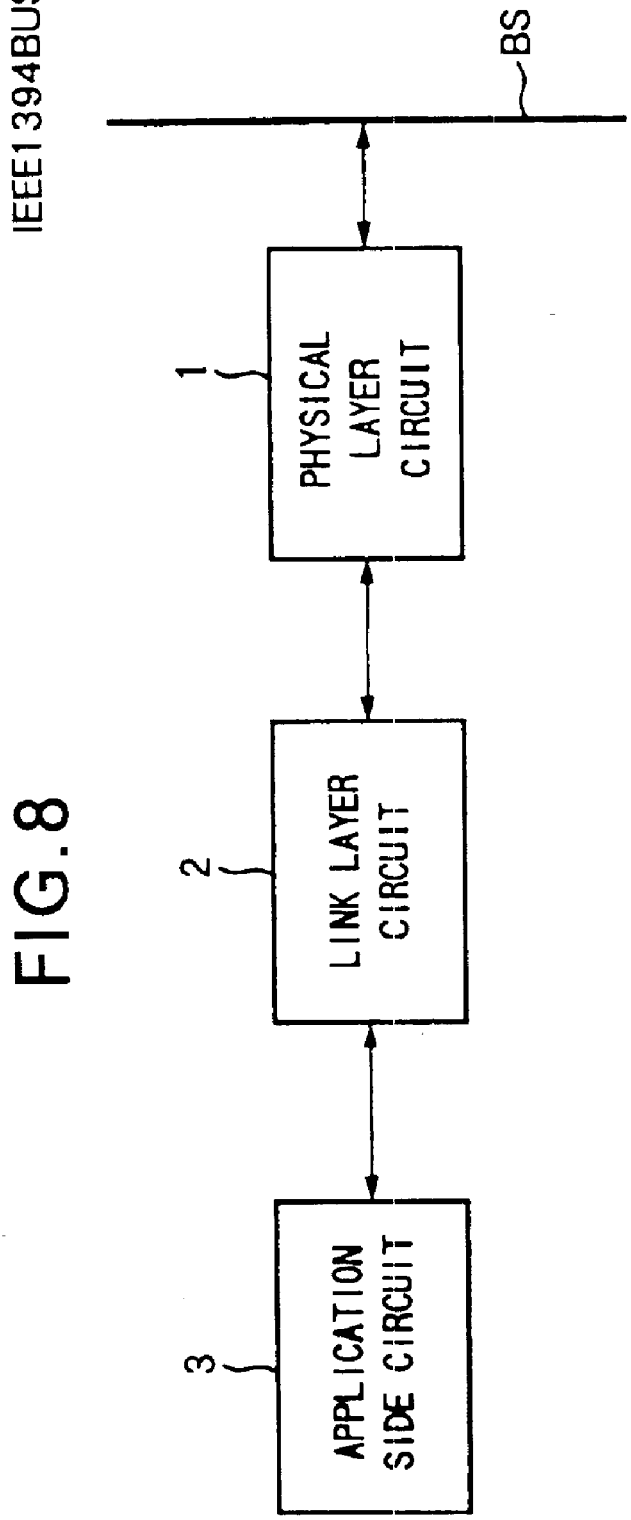
FIG. 8 is a block diagram of the basic configuration of an isochronous communication system in an IEEE 1394 serial interface.

The post-transmission processing circuit 109, as shown in FIG. 7, adds a 1394 header, a header CRC, CIP headers 1 and 2, and data CRC to the data of the selected channel stored in the transmission FIFO circuit 112 and transmission/reception FIFO circuit 113 and outputs it to the transmission circuit of a link core circuit 101.

Specifically, as shown in FIG. 7, the 1394 header comprised of a "data-length" region indicating a data length, "channel" region indicating the number of channels (any one of 0 to 63) to be transferred. "tcode" region indicating a processing code, and a synchronization code "sy" region defined by each application, the CIP header comprised of a "SID (source node ID)" region for a transmission node number, a "DBS (data block size)" region for a data block length, an "FN (fraction number)" region for the fraction number in packeting, a "QRC (quadlet padding count)" region for a quadlet number of the padding data, an "SPH" region for a flag indicating an existence of the source packet header, and a "DBC" region for a counter for detecting the number of isochronous packet data, and the CIP header 2 comprised of an "FMT" region for a signal format indicating a kind of data to be transmitted, an "FDF (format dependent field) region to be used in accordance with the signal format, and a "SyncTime" region for time stamp information are added.

Pre-Reception Processing Circuit 110

The pre-transmission processing circuit 110 receives isochronous communication packet data transferred by the IEEE 1394 serial bus BUS via the link core circuit 101, analyzes the contents of the received packet data such as a 1394 header, CIP headers 1, 2, etc., restores the data included in the packet data, and stores the restored data to the transmission/reception FIFO 113.

The Post-Reception Processing FIFO 111

The post-reception processing circuit 111 outputs the data read from the transmission/reception FIFO 113 to the application interface circuit 103. When the data is encoded/ciphered at this time, the post-reception FIFO 111 decodes the data.

The operation of extracting TS packet data of a desired channel from the TS data comprising a plurality of multiplexed channels output from the MPEG2 transporter 41 and transmitting the isochronous communication packet data including the extracted TS packet data to the IEEE 1394 serial bus BUS will be explained below.

In this case, first, channel specifying data $CPID_1$ and $CPID_2$ for specifying the channel to be extracted from the TS stream comprising a plurality of multiplexed channels of digital satellite broadcasting are respectively set from the CPU 30 in the PID registers $Reg_1$ and $Reg_2$ in the CFR 114.

Also, when it is required that insert packet data IPD which should be added as information of the channel (program) needs to be inserted, for example, to the TS stream of the extracted channel, a logic value of "1" is set from the CPU 30 to the register IPTxGo in the CFR 114.

Then, the channel specifying data $CPID_1$ and $CPID_2$ set in the PID registers $Reg_1$ and $Reg_2$ in the CFR 114 are read to the channel selection circuit 200 of the application interface circuit 103.

In the channel selection circuit of the application interface circuit 103, a plurality of packet data composing the TS data comprised of a plurality of multiplexed channels of digital satellite broadcasting is input as data Data_IN shown in FIG. 4C, delayed by exactly 5 clock cycles, and output as data Data_OUT shown in FIG. 4P to the pre-transmission processing circuit 108 in the latter part.

Also, in the channel selection circuit 200, a packet enable signal $PEN\_OUT_1$ is generated. Its logic value becomes "1" at a timing when TS packet data having the identical channel identification data $PID_2$ with the channel specifying data $CPID_1$ among a plurality of TS packet data comprising the TS data is output as data Data_OUT from the application interface 103 to the pre-transmission processing circuit 108, while the logic value becomes "0" at other timings. The packet enable signal $PEN\_OUT_1$ is output to the pre-transmission processing circuit 108.

In the channel selection circuit 200, a packet enable signal $PEN\_OUT_2$ is generated. Its logic value becomes "1" at a timing when TS packet data having the identical channel identification data $PID_2$ with the channel specifying data $CPID_2$ among a plurality of TS packet data comprising the TS data is output as data Data_OUT from the application interface 103 to the pre-transmission processing circuit 108, while the logic value becomes "0" at other timings. The packet enable signal $PEN\_OUT_2$ is output to the pre-transmission processing circuit 108.

In the channel selection circuit 200, a packet enable signal IPEN_OUT is generated. Its logic value becomes "1" at a timing when TS packet data having a channel identification data $PID_2$ not identical with the channel specifying data $CPID_1$ nor $CPID_2$ (not selected TS packet data) among a plurality of TS packet data comprising the TS data is output as data Data_OUT from the application interface 103 to the insert packet buffer 106, while the logic value becomes "0" at other timings. The packet enable signal IPEN_OUT is output to the insert packet buffer 106.

Then, 188 bytes of insert packet data IPD stored in the insert packet buffer 106 when the insert enable signal IPEN_OUT has a logic value of "1" is output to the pre-transmission processing circuit 108 via the application interface circuit 103.

Note that the insert packet data IPD is written in advance from the CPU 30 to the insert packet buffer 106 via the host interface circuit 120.

Then, in the pre-transmission processing circuit 108, the insert packet data input from the insert packet buffer 106 is adjusted in its data length in units of quadlet (4 bytes) for the isochronous communication and re-written to the transmission FIFO circuit 112 or transmission/reception FIFO circuit 113.

Specifically, based on the contents of a predetermined register in the CFR 114, when the insert packet data input to the pre-transmission processing circuit 108 indicates information as to the TS packet data of the channel to be transmitted via the transmission FIFO circuit 108, the insert packet data IPD is written to the transmission FIFO 112, while when it indicates information as to the TS packet data of the channel to be transmitted via the transmission/reception FIFO 113, the insert packet data IPD is written in the transmission/reception FIFO 113.

Note that when the insert packet data IPD is output from the insert packet buffer 106 to the pre-transmission processing circuit 108, the packet enable signal PEN_OUT1 and PEN_OUT2 output from the application interface circuit 103 to the pre-transmission processing circuit 108 has a logic value of "0", and the data Data_OUT output from the application interface circuit 103 to the pre-transmission processing circuit 108 is not written to the transmission FIFO circuit 112 and the transmission/reception FIFO circuit 113.

Further, in the pre-transmission processing circuit 108, when the packet enable signal PEN_OUT$_1$ input from the application interface circuit 103 has a logic value of "1", the data Data_OUT input from the application interface circuit 103 is adjusted in its data length in units of quadlets (4 bytes) for isochronous communication and written to the transmission FIFO circuit 112.

On the other hand, in the pre-transmission processing circuit 108, when the packet enable signal PEN_OUT$_2$ input from the application interface circuit 103 has a logic value of "1", the data Data_OUT input from the application interface circuit 103 is adjusted in its data length in units of quadlets (4 bytes) for isochronous communication and written to the transmission/reception FIFO circuit 113.

Next, data stored in the transmission FIFO circuit 112 or transmission/reception FIFO circuit 113 is read out to the post-transmission processing circuit 109 and given the 1394 header, the CIP headers 1 and 2, etc. shown in FIG. 7 to generate packet data for isochronous communication, and the packet data is output to the link core 101.

Next, the packet data output from the post-transmission processing circuit 109 to the link core 101 is output to the physical layer circuit 20 every 125 µs and encoded in the physical layer circuit 20, then output to the IEEE 1394 serial bus BUS.

The operation for receiving packet data for isochronous communication via the IEEE 1394 serial bus BUS will be explained next.

First, packet data for isochronous communication transferred in the IEEE 1394 serial bus BUS is output to the pre-reception processing circuit 110 via the physical layer circuit 20 and the link core 101, to the contents of the 1394 header, the CIP headers 1 and 2, etc. included in the received packet data are analyzed, data included in the received packet data is restored, and the restored data is written to the transmission/reception FIFO circuit 113.

Then, data is read from the transmission/reception FIFO circuit 113 to the post-reception processing circuit 111, deciphered when the data is ciphered, and output to the application interface circuit 103.

The data is output to the D/A converter 43 or the IEC 958 via the application interface circuit 103.

As explained above, according to the present embodiment, when TS data comprised of a plurality of multiplexed channels of digital satellite broadcasting is input from the MPEG2 transporter 41, the channel selection circuit 200 shown in FIGS. 2 and 3 compares the channel specifying data CPID$_1$ and CPID$_2$ indicating the channel identification data PID$_2$ of the channel to be selected set in advance in the PID registers Reg$_1$ and Reg$_2$ in the CFR 114 with channel identification data PID$_2$ included in the input packet data to generate the packet enable signals PEN_OUT$_1$ and PEN_OUT$_2$ which become standards for judging whether or not to transmit the TS packet data via the IEEE 1394 serial bus BUS.

Then, the later stage pre-transmission processing circuit 108 determines whether or not to write the input TS packet data to the transmission FIFO circuit 112 and transmission/reception FIFO circuit 113 based on the packet enable signals PEN_OUT$_1$ and PEN_OUT, so as to enable selection of a maximum of 2 channels of TS packet data to be transmitted via the IEEE 1394 serial bus BUS from the TS data comprised of a plurality of channels of digital satellite broadcasting.

Furthermore, according to the present embodiment, the enable signal generation circuit 212 of the channel selection circuit 200 shown in FIG. 2 generates an insert enable signal IPEN_OUT wherein its logic value becomes "1" at a timing of outputting from the application interface circuit 103 to the pre-transmission processing circuit 108 the TS packet data not to be selected included in the TS data comprised the plurality of multiplexed channels.

Therefore, by outputting to the pre-transmission processing circuit via the application interface circuit 103 the insert packet data IPD stored in the insert packet buffer 106 at the timing when the logic value of the insert enable signal IPEN_OUT has a logic value of "1", it becomes possible to transmit the insert packet data indicating the information regarding the program to be provided by the TS packet data during the time the TS packet data is not transmitted on the IEEE 1394 serial bus BUS.

The present invention is not limited to the above embodiments.

For example, in the above embodiments, a case where TS packet data for two channels was isochronously transferred from the link layer circuit 10 to the IEEE 1394 serial bus BUS via the physical layer circuit 20 was explained as an example, however, the present invention can be also applied to the case of isochronously transferring TS packet data for one channel.

In such a case, the PID comparison circuit 208 shown in the FIG. 2 and the OR circuit 232$_2$, AND circuit 236$_2$, and the D-FF circuit 216$_{10}$ shown in FIG. 3 are not necessary, and an NOT circuit is used instead of the NOR circuit 234 shown in FIG. 5.

Also, in the above embodiment, a case where the TS packet data of a desired channel was selected and output from the TS data comprised of a plurality of multiplexed channels input from the MPEG2 transporter 41 was explained as an example, however, the present invention can also be applied to the case of inputting data from an application other than the MPEG2 transporter 41 so long as data having a plurality of multiplexed channels is output.

As explained above, according to a data processing circuit of the present invention, it is possible to select and output packet data of a specified channel from data having a plurality of multiplexed channels to a data transferring path.

Furthermore, according to the data processing circuit of the present invention, it is possible to transfer information data regarding the packet data of the selected channel besides the packet data of the selected channel.

While the invention has been described with reference to specific embodiment chosen for purpose of illustration, it should be apparent that numerous modifications could be made thereto by those skilled in the art without departing from the basic concept and scope of the invention.

What is claimed is:

1. A data processing circuit utilized for a serial interface comprising:
   a receiving circuit coupled to an application side which receives as input a plurality of packet data of a plurality of channels therefrom;
   a selection circuit having a channel identification data extracting circuit for extracting channel identification data regarding a number of selected channels in said input packet data, a comparison circuit for comparing said extracted channel identification data with channel specifying data, and a packet data validity instruction signal generation circuit for outputting a packet data validity instruction signal indicating whether said packet data is valid or not based on a result of the comparing;

a circuit for providing insert data; and a transmission circuit for providing said input packet data to a data transmission path when said packet data validity instruction signal is valid, and for transmitting said insert data to said data transmission path when the instruction signal is invalid, wherein said insert data is information data regarding said selected channel.

2. A data processing circuit as set forth in claim 1, wherein said channel identification data extraction circuit receives as input a packet data input timing signal for specifying an input timing of said packet data from said application side and extracts channel identification data regarding a selected channel in said input packet data based on said packet data input timing signal.

3. A data processing circuit as set forth in claim 1, further comprising a memory circuit for storing said channel specifying data.

4. A data processing circuit as set forth in claim 3, further comprising a computer for writing said channel specifying data to said memory circuit.

5. A data processing circuit as set forth in claim 1, further comprising:

a transmission packet data memory circuit for storing packet data to be transmitted to said data transmission path;

wherein said transmission circuit selects said input packet data and writes it to a transmission packet data memory circuit when said packet data validity instruction signal indicates validity.

6. A data processing circuit as set forth in claim 1, wherein the serial interface is a 1394 serial interface.

* * * * *